UNITED STATES PATENT OFFICE.

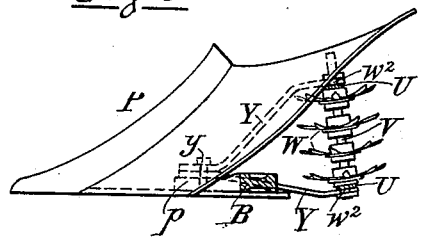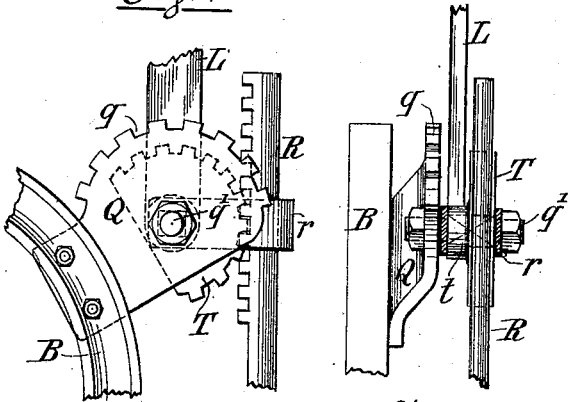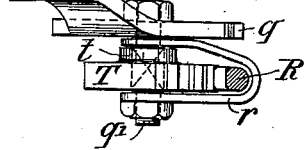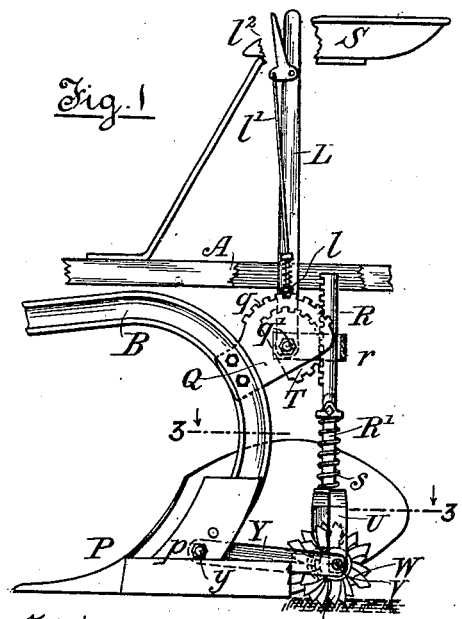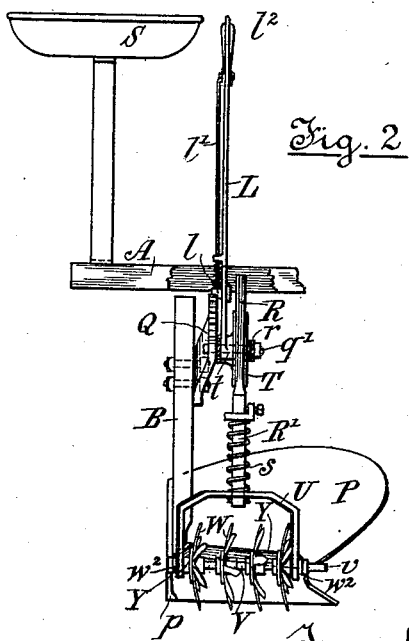

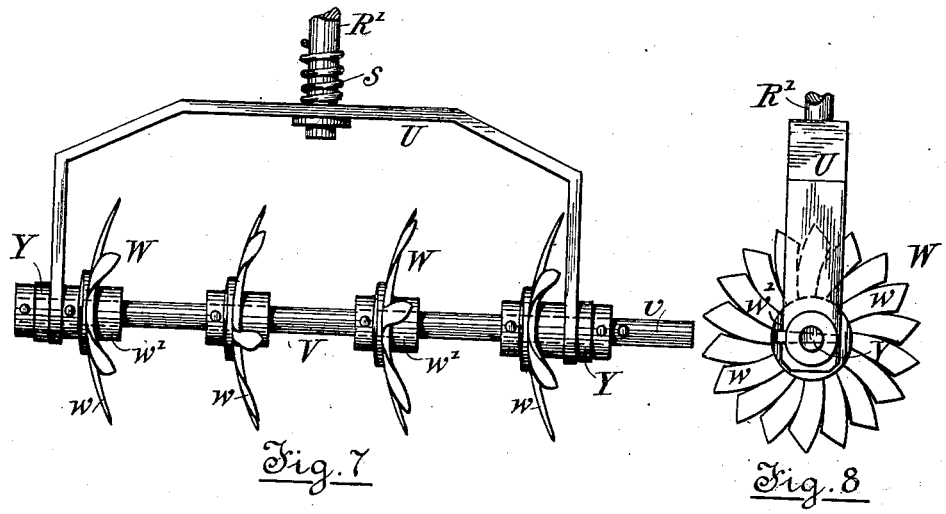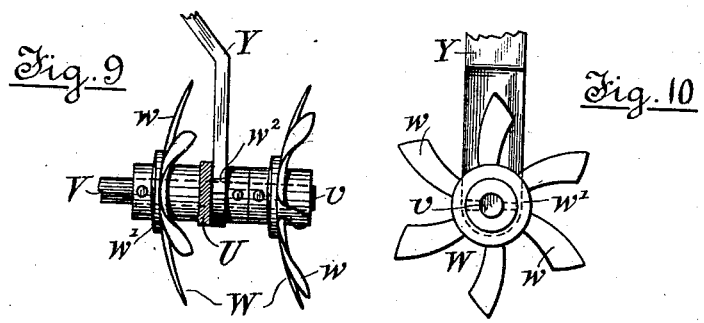

AMOS KENWORTHY, OF HILLSDALE, OREGON.

FURROW-SUBSOIL-BREAKING ATTACHMENT FOR PLOWS.

991,855.  Specification of Letters Patent.  Patented May 9, 1911.

Application filed July 28, 1910. Serial No. 574,351.

*To all whom it may concern:*

Be it known that I, AMOS KENWORTHY, a citizen of the United States, and resident of Hillsdale, in the county of Multnomah and State of Oregon, have invented a certain new and useful Improved Furrow-Subsoil-Breaking Attachment for Plows, of which the following is a specification.

This invention relates to sulky and gang plows in so far as there has been combined with any of the forms of same a rotary harrow following the plow shares,—but contrary to the constructions and purposes now in vogue which aim at the pulverization and leveling—by rotary harrows—of the earth clods thrown out of the furrows by the plow, my improvement is directed to the mechanical treatment of the smooth bottom of the furrow itself after the passage therethrough of the plowshare, and before the earth from the next furrow is turned over upon the first.

The object of the invention is to so definitely penetrate and break up the bottom of a furrow—which has been formed and to some extent smoothly flattened by the plowshares—as to effectually drain away from the surface or cause to be absorbed therein any surplus water which may exist upon the land previous to or during plowing, as well as to retain the ordinary or natural moisture between plowing and planting time, and to further prepare the subsoil so that the crops may more readily take root downward in and through the first and second sub-soils, a desideratum of importance to farmers.

To these and other useful ends, my improvement consists in instrumentalities connected to the main plow-beam embodying rotary sub-soil breaking devices adapted to be positively raised, lowered and maintained in the furrow, and under easy control from the plowman's seat carried upon the general framing of any ordinary sulky or gang plow.

For full comprehension of the invention and of the various details of construction and arrangement of a preferred form of same, reference must be had to the accompanying drawings forming part of this specification, in which similar letters of reference indicate like parts.

In said drawings: Figure 1 is a side elevation of part of a sulky plow provided, with my improved sub-soil breaking attachment. Fig. 2 is a rear end elevation of same. Fig. 3 is a sectional plan taken on the line 3, 3, Fig. 1. Figs. 4, 5 and 6 are enlarged detail views of the adjusting and holding devices for the sub-soil breaker proper. Fig. 7 is an enlarged side elevation of the sub-soil breaker. Fig. 8 is an end elevation of same. Fig. 9 is a sectional plan of part of Fig. 7 showing supplementary blades on outer end of breaker shaft, and Fig. 10 an end elevation of same.

Premising that my invention is adapted equally for use with single, double or multiple plow shares, *i. e.* for either sulky or gang plows, by simply duplicating the furrow-breakers so that one may run in each furrow after the latter has been formed by one share of any form of wheel-plow, I have only shown part of a sulky plow with one share and one furrow-breaker following immediately behind it, deeming such illustration and the following description thereof, and of my improvement, sufficient to enable any one skilled in the art to put the invention to its more extended use.

A represents a portion of the main frame of a plow of any of the forms mentioned, and S the driver's seat carried thereby in any suitable manner at some point conveniently above my sub-soil breaking devices for him to manipulate the adjusting lever L.

B indicates a portion of any ordinary curved beam, carried in any suitable manner by the frame A, to the lower end of which beam is attached the plow-share or mold-board P, also of any preferred construction, none of the above mentioned instrumentalities forming any part of my invention.

At a convenient point of the curved beam

B, intermediate of the plow P and main frame A, is firmly bolted a bracket or plate Q offset therefrom and projecting toward the rear, and taking the form of a quadrant having notches $q$ on its upper edge with which engages a spring-controlled locking pawl $l$ actuated by the rod $l^1$ and hand lever $l^2$ carried by the main actuating lever L. The lower end of this lever L is fixed to or formed in one with the hub $t$ of a segment-shaped toothed gear T pivotally-supported in the quadrant plate Q by a bolt $q^1$. Meshing with the gear T is a vertically-movable rack-bar R held in position by a loosely-embracing strap $r$ the ends of which are carried by the bolt $q^1$ which passes loosely through them at either side of the gear T, while that portion of the bolt which carries said gear is squared so as to insure their rotary movement conjointly when the lever L is actuated. The lower end of this vertically-disposed rack-bar R takes the form of or has fixed thereto a shaft or spindle $R^1$ provided with a coiled spring S, normally in expansion, the lower end of this spindle supporting a yoke-bar U, preferably by passing loosely through the top-bar thereof and held underneath the same by a cross pin, collar or other suitable device in such manner that the yoke-bar (and its accessories, to be described,) may have vertical movement upon the spindle against the spring. The yoke U is of any suitable form and weight of material, the two end-bars thereof depending at right angles from the top-bar and affording proper journals for the sub-soil breaker-shaft B which, with the yoke itself, is disposed at an angle (common to disk-plows) across the furrow line, that end of the shaft which is toward the cut land side preferably projecting a sufficient distance beyond the yoke to accommodate one or more extra rotary breakers, as shown at $v$, in Figs. 7 and 9, to provide for different widths of furrow.

I prefer to use about four breakers W, W, within the yoke U, these being rotary in character and, by preference, made up of a plurality of curved and radially-disposed blades $w$, $w$, of steel and sufficiently sharp at their points and edges as to easily cut through, channel and pulverize the earth at the bottom of the plow-formed furrow for the desired depth which is regulated by the degree of depression given thereto by the lever L actuating the yoke and breakers as already described. The blades $w$ of the breakers W have a common hub $w^1$ in each, such hubs being keyed, pinned or otherwise firmly secured to the shaft V so as to rotate therewith.

As seen particularly in Figs. 1 and 3, the breaker shaft V finds end-journals $w^2$, $w^2$, in two bent bars Y, Y, which extend forward and are pivoted at $y$ to a plate or arm $p$ bolted to the plow P, or directly to the beam B, or to any suitable projection therefrom according to the particular style and arrangement of plow to which my invention may be attached.

The operation of my invention, and the advantages arising from the direct vertical and positive adjustment of the furrow-subsoil breaker, will be so apparent to farmers and manufacturers of this class of agricultural implements as to need no further explanation, but I wish it to be understood that I do not limit myself to the precise details of construction and arrangement of devices shown, as the same may be varied and re-arranged according to judgment and circumstances without departing from the principles or sacrificing the advantages of my invention.

What I claim and desire to secure by Letters Patent is as follows:—

1. A furrow sub-soil-breaking attachment for plows, consisting, essentially, of a breaker-shaft having a plurality of breaking devices fixed thereon and rotatable therewith,—arms affording journals for said breaker-shaft and finding pivotal support upon the plow,—a yoke also affording journal-support for said breaker shaft,—a vertically-disposed spindle or shaft loosely supporting said yoke,—a rack-bar forming an extension of said spindle or shaft in the same vertical line,—a gear engaging said rack-bar,—a bracket fixed to the plow-beam and affording pivotal support for said gear,—and a lever for moving said gear upon said rack-bar.

2. A furrow sub-soil-breaking attachment for plows, consisting, essentially, of a breaker-shaft having a plurality of breaking devices fixed thereon and rotatable therewith,—arms affording journals for said breaker-shaft and finding pivotal support upon the plow,—a yoke also affording journal-support for said breaker shaft,—a vertically-disposed spindle or shaft loosely supporting said yoke,—a rack-bar forming an extension of said spindle or shaft in the same vertical line,—a gear engaging said rack-bar,—a quadrant-shaped notched bracket fixed to the plow-beam and affording pivotal support for said gear,—a lever for moving said gear upon said rack-bar,—and a locking device engaging the notches on said bracket and connected with said lever.

3. A furrow sub-soil-breaking attachment for plows, consisting, essentially, of a breaker-shaft having a plurality of breaking devices fixed thereon and rotatable therewith,—arms affording journals for said breaker-shaft and finding pivotal support upon the plow,—a yoke also affording journal-support for said breaker shaft,—a vertically-disposed spindle or shaft loosely supporting said yoke,—a rack-bar forming an extension of said spindle or shaft in the same vertical line,—a gear engaging said rack-bar,—a quadrant-shaped notched bracket fixed to the plow-beam and affording pivotal support for said gear,—a lever for moving said gear upon said rack-bar,—and a strap loosely embracing the rack-bar and supported at its ends by said pivotal support.

In witness whereof, I have signed in the presence of the two subscribing witnesses.

AMOS KENWORTHY.

Witnesses:
Z. L. DIMMICK,
J. H. MORTON.

Copies of this patent may be obtained for five cents each, by addressing the "Commissioner of Patents, Washington, D. C."